United States Patent Office.

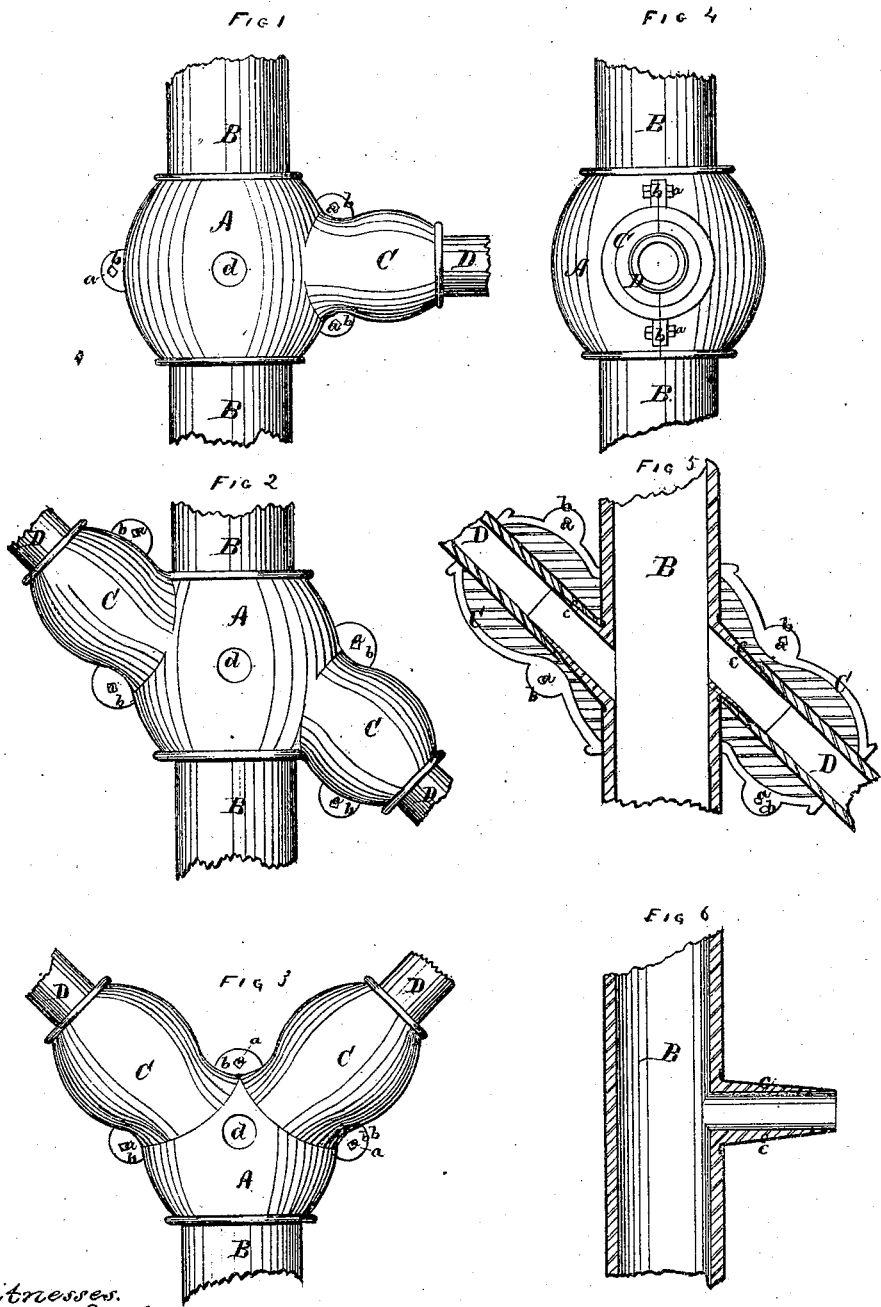

EDWIN DAYTON, OF MERIDEN, CONNECTICUT.

Letters Patent No. 96,555, dated November 9, 1869.

IMPROVEMENT IN LATERAL OR DIVERGING CONNECTIONS FOR CEMENT WATER-PIPES.

The Schedule referred to in these Letters Patent and making part of the same.

*To all whom it may concern:*

Be it known that I, EDWIN DAYTON, of Meriden, in the county of New Haven, and State of Connecticut, have invented a new and useful Improvement in Couplings for Branches and Angles of Cement Water-Pipes; and I do hereby declare that the following is a full and exact description of the same, reference being had to the accompanying drawings, and to the letters of reference marked thereon.

Figure 1 is a side view of my improvement, showing one branch entering the main at right angles.

Figure 2 is a side view of the same, showing two branches entering the main at different angles in opposite directions.

Figure 3 shows a method of attaching a double branch at the end or terminus of the pipe.

Figure 4 is an end view of the branch collar, showing the longitudinal division of the box or shell, and the manner of holding the two parts together.

Figure 5 is a longitudinal section of fig. 2, taken through line $x\ x$.

Figure 6 is a longitudinal section of the pipe, with the box or shell removed.

My invention relates to an improvement in the manner of forming joints upon cement water-pipes, and connecting two or more sections of pipe running at different angles with each other; and consists of a metallic box or shell, made to fit closely to the main at each end, and provided upon one or both sides with a branch shell or collar, attached to and made a part of the main shell, and extending in the direction required for the branch-pipe, the whole box consisting of the main shell, and the branch collar is divided longitudinally through the centre, to allow of its being readily attached to the pipe at any point.

The object of my invention is to avoid the expense now attending the branching of this class of pipe.

This operation, as now performed by fitting the branch upon the main, and soldering the parts, requires much labor in scraping and preparing the surface of the pipes, and also necessitates the use of a large amount of solder to insure a perfectly tight joint, thus causing so much expense as to be detrimental to the sale of such pipe. Whereas, by the use of my improvement, a perfectly tight joint may be obtained with little labor and slight expense.

To enable others skilled in the art to make and use my invention, I will proceed to describe the construction and operation of the same, with reference to the accompanying drawings.

A is the main shell, made of oval shape, and closed at each end upon the pipe B.

This shell may be furnished with one or more branch shells or collars, C, cast with or otherwise fastened upon it, and extending therefrom at any angle which the direction of the branch-pipe may require.

The whole box or shell is longitudinally divided through the centre, and is held together by rivets, $a\ a$, through the ears $b\ b$, or other convenient means, as shown in figs. 1, 2, and 4.

The outer ends of the branch collar is closed upon the branch-pipe D, in a similar manner to the main shell, as shown in figs. 1 and 2.

$c$ is a short conical-shaped pipe, corresponding in size, at its largest end, with a hole cut in the main pipe, and at the smaller end with the opening in the branch, the cement lining of said branch being bevelled for that purpose.

In the main or auxiliary shells are one or more openings, $d$, for filling the space intervening between the shell and pipes with cement or similar substance. This completes the construction of my improvement.

The operation is as follows:

In the main pipe are made one or more holes, according to the number of branches desired, into each of which is fitted a conical pipe, $c$, and the whole lined with cement, as shown in fig. 6.

Upon this conical pipe is fitted the bevelled end of the branch-pipe D.

When the two pipes are thus jointed, the two halves of the shell are placed over the joint in such manner that the branch collars shall fit upon the branch-pipe, and the main shell upon the main pipe.

Bolts or rivets, $a\ a$, are then inserted through the ears $b\ b$, permanently holding the two halves together, after which the space intervening between the pipe and shell is filled with cement or other like substance, and the joint is finished.

I do not confine myself to the use of the conical pieces of pipe $c\ c$, for I am able to obtain a perfectly tight joint without them, by making the end of the branch to fit the circle of the main, and securing the joint by means of the box or shell, as before described.

Having thus fully described my invention,

What I claim as new and useful, and desire to secureby Letters Patent, is—

The box or shell A, provided with one or more branch collars, C, extending therefrom at any required angle, for jointing cement water-pipes, in the manner and for the purpose as herein specified.

This specification signed and witnessed, this 2d day of August, 1869.

EDWIN DAYTON.

Witnesses:
JAMES M. SMITH,
S. R. DICKSON.